United States Patent
Iijima

(10) Patent No.: US 6,507,380 B1
(45) Date of Patent: Jan. 14, 2003

(54) DISPLAY DEVICE AND ELECTRONIC APPARATUS USING THE SAME

(75) Inventor: Chiyoaki Iijima, Ina (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 09/269,538

(22) PCT Filed: Jul. 22, 1998

(86) PCT No.: PCT/JP98/03282
§ 371 (c)(1),
(2), (4) Date: Mar. 25, 1999

(87) PCT Pub. No.: WO99/05562
PCT Pub. Date: Feb. 4, 1999

(30) Foreign Application Priority Data

Jul. 25, 1997 (JP) ............................................... 9-200567

(51) Int. Cl.⁷ ............................................ G02F 1/1335
(52) U.S. Cl. .......................................... 349/96; 349/115
(58) Field of Search .............................. 349/97, 98, 96, 349/115, 64, 9, 112

(56) References Cited

U.S. PATENT DOCUMENTS 6,185,161 B1 * 2/2001 Arikawa et al. ............ 349/106
6,262,842 B1 * 7/2001 Ouderkirk et al. .......... 349/114
6,285,422 B1 * 9/2001 Maeda et al. ................ 345/87

FOREIGN PATENT DOCUMENTS

| JP | 61-293226 | 12/1986 |
|----|-----------|---------|
| JP | 63-170826 | 11/1988 |
| JP | 06-301029 | 10/1993 |
| WO | WO 95/01439 | 1/1995 |
| WO | WO 95/17303 | 6/1995 |
| WO | WO 95/17691 | 6/1995 |
| WO | WO 95/17692 | 6/1995 |
| WO | WO 95/17699 | 6/1995 |
| WO | WO 95/27919 | 10/1995 |
| WO | WO 96/19347 | 6/1996 |
| WO | WO 97/01440 | 1/1997 |
| WO | WO 97/01610 | 1/1997 |
| WO | WO 97/01726 | 1/1997 |
| WO | WO 97/01774 | 1/1997 |
| WO | WO 97/01778 | 1/1997 |
| WO | WO 97/01780 | 1/1997 |
| WO | WO 97/01781 | 1/1997 |
| WO | WO 97/01788 | 1/1997 |
| WO | WO 97/01789 | 1/1997 |
| WO | WO 97/07653 | 2/1997 |

* cited by examiner

Primary Examiner—Toan Ton
(74) Attorney, Agent, or Firm—Harness, Dickey & Pierce, P.L.C.

(57) ABSTRACT

A polarizer 130 is provided on the upper side of a TN liquid crystal 140, and a light scattering layer 150, a polarization separator 160, a polarizer 170 and a light source 190 are provided on the lower side of the TN element 140. The polarized light separator 160 causes a linear polarized light component in the direction of a transmission axis of light incident from above to be transmitted, and reflects a linear polarized light component thereof in the direction of a reflection axis orthogonal thereto. Under external light, it becomes white in a voltage non-application portion 120, and it becomes dark in a voltage application portion 110. Under light source light, it becomes dark in the voltage non-application portion 120, and it becomes light in the voltage application portion 110. The polarized light separator 160 and the polarizer 170 are arranged such that the transmission axis of the polarized light separator 160 is deviated from the transmission axis of the polarizer 170 by a predetermined angle θ and deviated from the absorption axis of the polarizer 170 by a predetermined angle θ'.

23 Claims, 10 Drawing Sheets

| MODE | | CHARACTERISTIC | EMBODIMENT | COMPARATIVE EXAMPLE |
|---|---|---|---|---|
| REFLECTION | | CONTRAST | 2.9 | 2.9 |
| | | REFLECTANCE | 7.1 | 4.3 |
| LIGHT SOURCE LIGHT | | CONTRAST | 3.1 | 2.7 |
| | | TRANSMITTANCE | 10.7 | 11.1 |

Fig. 7

DISPLAY DEVICE AND ELECTRONIC APPARATUS USING THE SAME

TECHNICAL FIELD

The present invention relates to a display device particularly to a display device and such as a liquid crystal display device which is equipped with a polarized light separator, such as a polarizer or a reflective polarizer, and which can serve as both a reflective type device that displays by reflecting external light and a transmissive type device that displays by allowing light from a light source to be transmitted and, further, to an electronic apparatus such as a portable telephone and a watch using such a display device.

BACKGROUND ART

Conventionally, in the case of a reflective type device, which displays by using external light, the display becomes rather hard to see in a dark place as the quantity of light decreases. On the other hand, in the case of a transmissive type device, which displays by using a light source, such as a backlight, the power consumption is rather large due to the light source regardless of whether the device is used in a light place or a dark place. In particular, it is not suitable for a portable display device or the like of the type which is operated by a battery. In view of this, a transflective display device, which can serve as both a reflective type and a transmissive type device, effects reflective type display, mainly in a light place, by controlling the quantity of light emitted from the display screen for each pixel by means of optical elements, such as liquid crystal and a polarized light separator arranged in the optical path thereof while reflecting external light entering from the display screen by a transflective film provided in the device. On the other hand, it effects transmissive type display, mainly in a dark place, by controlling the quantity of light emitted from the display screen for each pixel by means of the above-mentioned optical elements such as liquid crystal and the polarized light separator while applying light from a built-in light source, such as backlight, from behind the above-mentioned transflective film.

A liquid crystal display device which is thus capable of being used as both a reflective type and a transmissive type device and which utilizes a variable transmission polarization axis optical element that rotates the polarization axis of transmission light of a conventional TN (Twisted Nematic) liquid crystal or STN (Super-Twisted Nematic), adopts a construction in which this variable transmission polarization axis optical element is placed between two polarizers.

In the case of the above-described reflective type display, in the construction equipped with these two polarizers, when external light impinges upon the display screen, only a polarized light component in a specific direction is transmitted through the first polarizer on the display screen side of the liquid crystal, and the other polarized light component is absorbed by this first polarizer. The direction of polarization of the light transmitted through the first polarizer is selectively varied in accordance with the orientation of the liquid crystal, which varies depending on the voltage applied to the liquid crystal, and the light impinges upon the second polarizer on the other side of the liquid crystal. For example, in a normally white mode, this external light behaves as follows with respect to each pixel: (i) when no voltage is applied to the liquid crystal, the light emitted from this liquid crystal is transmitted through the second polarizer and is further reflected by a reflection plate on the back side thereof, and then transmitted again through the second polarizer, the liquid crystal and the first polarizer to be emitted from the display screen of the liquid crystal display device as display light; and (ii) when a voltage is applied to the liquid crystal, the light emitted from this liquid crystal is absorbed by the second polarizer and no display light is eventually emitted from the display screen.

In this way, reflective type display is effected by controlling the quantity of display light emitted from the display screen for each pixel using the liquid crystal, polarizer or the like arranged in the optical path of external light while reflecting the external light impinging from the display surface by a reflection film provided inside the device.

In the case of the above mentioned transmissive type display, in the construction in which these two polarizers are provided, when light from a light source is emitted from behind the liquid crystal as seen from the display screen, only a polarized light component in a specific direction is transmitted through the second polarizer on the back side of the liquid crystal, and the other polarized light component is absorbed by this second polarizer. The direction of polarization of the light transmitted through the second polarizer is selectively varied in accordance with the orientation of the liquid crystal depending on the voltage applied to the liquid crystal, and the light impinges upon the first polarizer on the display screen side of the liquid crystal. This light from the light source behaves, for example, in normally white mode, as follows with respect to each pixel: (i) when no voltage is applied to the liquid crystal, the light emitted from this liquid crystal is transmitted through the first polarizer, and emitted from the display screen of the liquid crystal display device as display light, and (ii) when a voltage is applied to the liquid crystal, the light emitted from this liquid crystal is absorbed by the first polarizer and no display light is emitted from the display screen.

In this way, the transmissive type display is effected by controlling the quantity of light emitted from the display screen for each pixel using the liquid crystal, polarizer or the like arranged in the optical path of the light from the light source.

DISCLOSURE OF INVENTION

However, a polarizer, which is an example of the polarized light separator, effects polarization by absorbing the polarized light component which is in a direction different from a specific polarization axis direction of the incident light, so that the efficiency in the utilization of light is rather poor. Thus, in reflective type display and transmissive type display, which are effected, as described above, with two polarizers arranged on either side of the liquid crystal, the display is rather dark. If an attempt is made to brighten the display by simply replacing the polarizers by some other polarized light separation means, the contrast in display, which is regarded as important as the brightness of display, deteriorates.

The present invention has been made in view of the above problem. It is an object of the present invention to provide a display device of the type which can display high contrast and bright display at the reflective display and the transmissive display and an electronic apparatus using this display device in a display device utilizing a variable transmission polarization axis variable optical element such as liquid crystal.

The above object of the present invention is achieved by a display device comprising: variable transmission polarization axis means capable of varying a transmission polarization axis; first polarized light separating means which is arranged on one side of the variable transmission polarization axis means and which allows light that is a linear polarized light component in a first direction to be transmitted and reflects or absorbs light that is a linear polarized light component in a predetermined direction different from the first direction; second polarized light separating means which is arranged on the other side of the variable transmission polarization axis means and which allows light that is a linear polarized light component in a second direction to be transmitted and reflects light that is a linear polarized light component in a predetermined direction different from the second direction; a polarizer arranged on the opposite side of the variable transmission polarization axis means with respect to the second polarized light separating means; and a light source which is arranged on the opposite side of the second polarized light separating means with respect to the polarizer and which applies light to the variable transmission polarization axis means side, wherein the positional relationship between the second polarized light separating means and the polarizer is determined such that the second direction is deviated by a predetermined angle θ (0°<θ<90°) with respect to the direction of the transmission axis of the polarizer and deviated by a predetermined angle θ' (0°<θ'<90°) with respect to the direction of the absorption axis of the polarizer.

In the display device of the present invention, when reflective type display is effected by utilizing external light, external light is entered from the first polarized light separating means side. The first polarized light separating means allows the light of the linear polarized light component in the first direction of the incident external light to be transmitted to the variable transmission polarization axis means side. Then, the first polarized light separating means reflects or absorbs the linear polarized light component in the predetermined direction different from the first direction (for example, a direction orthogonal or substantially orthogonal to the first direction). Next, the second polarized light separating means allows the light of the linear polarized light component in the second direction of the incident light entering through the first polarized light separating means and the variable transmission polarization axis means to be transmitted to the side opposite to the variable transmission polarization axis means, and reflects the light of the linear polarized light component in the predetermined direction different from the second direction (for example, a direction orthogonal or substantially orthogonal to the second direction). As for the light transmitted through the second polarized light separating means, the component in the direction of the absorption axis thereof is absorbed by the polarizer, and, as for the light transmitted through the polarizer, it is reflected or diffused in the light source portion in a non-lighted state. On the other hand, the light reflected by the second polarized light separating means passes through the variable transmission polarization axis means and the first polarized light separating means in the reverse order as the above.

As a result, in the case of reflective type display, there are obtained a first (relatively bright) display state due to emission of the light reflected by the second polarized light separating means through the variable transmission polarization axis means from the first polarized light separating means side selectively in accordance with the direction of the transmission axis in the variable transmission polarization axis means, and a second (relatively dark) display state due to non-emission of the light transmitted through the second polarized light separating means from the first polarized light separating means side due to the absorption by the polarizer or the like. In particular, the positional relationship between the second polarized light separating means and the polarizer is determined such that the second direction is deviated by a predetermined angle θ (0°<θ<90°) with respect to the direction of the transmission axis of the polarizer, so that compared with the case in which the second direction coincides with the direction of the transmission axis of the polarizer (that is, θ=0°), the light transmitted through the second polarized light separating means is absorbed in a much larger quantity by the polarizer. Thus, by this quantity absorbed, the quantity of light emitted eventually from the first polarized light separating means in the above-described second display state can be reduced, whereby the contrast in the reflective type display can be enhanced. Regarding the brightness in the reflective type display, compared with the case in which a polarizer is used as the second polarized light separating means as in the conventional case (or in which polarizers are used for both the first and second polarized light separating means), polarized light separation is effected not by the absorption of light but by the reflection of light and this reflected linear polarized light component is utilized as the display light, whereby a bright reflective type display is obtained.

On the other hand, when transmissive type display is effected by utilizing a light source, light from the light source is incident on the second polarized light separating means through the polarizer. The second polarized light separating means causes light of the linear polarized light component in the second direction of the incident light from the light source to be transmitted to the variable transmission polarization axis means side, and reflects light of a linear polarized light component in a predetermined direction different from the second direction. Further, the first polarized light separating means causes the light of the linear polarized light component in the first direction of the light entering through the second polarized light separating means and the variable transmission polarization axis means to be transmitted to the side opposite to the variable transmission polarization axis means, that is, the display screen side. Then, it reflects the linear polarized light component in the predetermined direction different from the first direction.

As a result, in the case of transmissive type display, there are obtained, selectively in accordance with the direction of the transmission axis in the variable transmission polarization axis means, a third (relatively bright) display state due to emission of the light transmitted through the second polarized light separating means from the first polarized light separating means side, and a fourth (relatively dark) display state due to reflection of the light from the light source by the first polarized light separating means. In particular, the positional relationship between the second polarized light separating means and the polarizer is determined such that the second direction is deviated by a predetermined angle θ'(0°<θ'<90°) with respect to the direction of the absorption axis of the polarizer, so that compared with the case in which the second direction coincides with the direction of the absorption axis of the polarizer (that is, θ'=0°), the light from the light source transmits in a much larger quantity through the polarizer and the second polarized light separating means. Thus, by this quantity transmitted, the quantity of light eventually emitted from the first polarized light separating means side in the above-described third display state can be increased, so that the contrast in the transmissive type display can be enhanced and, at the same time, the brightness can be enhanced.

In this way, by the display device of the present invention, it is possible to effect a high-contrast and bright display in a reflective type display and a transmissive type display and, in particular, it is possible to increase the brightness in a transmissive type display using light from a light source while enhancing the contrast in a reflective type display using external light.

In a form of the display device of the present invention, the first polarized light separating means consists of a reflective polarizer which allows the light of the linear polarized light component in the first direction to be transmitted and reflects the light of the linear polarized light component in a direction orthogonal to the first direction.

In this form, the reflective polarizer causes the linear polarized light component in the first direction of the incident light to be transmitted as the linear polarized light component in the first direction. Then, it reflects the linear polarized light component in the direction orthogonal to the first direction as the linear polarized light component in the orthogonal direction. Thus, display can be effected based on the light transmitted through the reflective polarizer.

In this form, the reflective polarizer may consist of a laminate formed by alternately stacking together birefringent first layers and second layers which have a refractive index that is substantially equal to one of the plurality of refractive indexes of the first layers and which are not birefringent.

In the reflective polarizer constructed as described above, the light of the linear polarized light component in the first direction of the incident light applied to one main surface of the reflective polarizer from the direction of lamination transmits to the other main surface on the opposite side as light of the linear polarized light component in the first direction. Then, the light of the linear polarized light component in the direction orthogonal to the first direction is reflected as the light of the linear polarized light component in the orthogonal direction. Of the light applied to the other main surface of the reflective polarizer from the direction of lamination, the light of the linear polarized light component in the first direction transmits to one main surface on the opposite side as the light of the linear polarized light component in the first direction. Then, the light of the linear polarized light component in the direction orthogonal to the first direction is reflected as the light of the linear polarized light component in the orthogonal direction.

In another form of the display device of the present invention, the first polarized light separating means consists of a polarizer which causes the light of the linear polarized light component in the first direction to be transmitted and absorbs the light of the linear polarized light component in the direction orthogonal to the first direction.

In this form, the polarizer causes the linear polarized light component in the first direction of the incident light to be transmitted as the linear polarized light component in the first direction and absorbs the linear polarized light component in the direction orthogonal to the first direction. Thus, display can be effected based on the light transmitted through the polarizer.

In another form of the display device of the present invention, the second polarized light separating means consists of a reflective polarizer which causes the light of the linear polarized light component in the second direction to be transmitted and reflects the light of the linear polarized light component in the direction orthogonal to the second direction.

In this form, the reflective polarizer causes the linear polarized light component in the second direction of the incident light to be transmitted as the linear polarized light component in the second direction. Then, it reflects the linear polarized light component in the direction orthogonal to the second direction as the linear polarized light component in the orthogonal direction. Thus, display can be effected based on the light transmitted through the reflective polarizer.

In this form, the reflective polarizer may consist of a laminate formed by alternately stacking together birefringent first layers and second layers which have a refractive index that is substantially equal to one of the plurality of refractive indexes of the first layers and which are not birefringent.

In the reflective polarizer constructed as described above, the light of the linear polarized light component in the second direction of the incident light applied to one main surface of the reflective polarizer from the direction of lamination transmits to the other main surface on the opposite side as light of the linear polarized light component in the second direction. Then, the light of the linear polarized light component in the direction orthogonal to the second direction is reflected as the light of the linear polarized light component in the orthogonal direction. Of the light applied to the other main surface of the reflective polarizer from the direction of lamination, the light of the linear polarized light component in the second direction is transmitted to one main surface on the opposite side as the light of the linear polarized light component in the second direction. Then, the light of the linear polarized light component in the direction orthogonal to the second direction is reflected as the light of the linear polarized light component in the orthogonal direction.

In another form of the display device of the present invention, the second polarized light separating means causes the linear polarized light component in the second direction to be transmitted and reflects the light of the linear polarized light component in the direction orthogonal to the second direction with respect to the light of substantially the entire wavelength range of visible light. In this form, there are obtained, in reflective type display, two display states in accordance with the direction of the transmission polarization axis in the variable transmission polarization axis means with respect to external light of substantially the entire wavelength range of visible light range. In one of these display states, display due to transparent reflection or white reflection is obtained. on the other hand, when a white light source is used in transmissive type display, two display states are obtained in accordance with the direction of the transmission polarization axis in the variable transmission polarization axis means with respect to substantially the entire wavelength of visible light range, and, in one of these display states, display due to transparent reflection or white reflection is obtained.

In another form of the display device of the present invention, the transmission axis and the absorption axis of the polarizer are at right angles.

In this form, the polarizer is an existing polarizer in which the transmission axis and the absorption axis are at right angles, and the predetermined angle θ'=90 degrees—the predetermined angle θ. Thus, in both reflective type display and transmissive type display, satisfactory contrast and brightness can be obtained by using a relatively simple construction.

In another form of the display device of the present invention, the predetermined angle θ is preferably 30 to 75 degrees.

In this form, more satisfactory contrast and brightness can be obtained in both reflective type display and transmissive type display.

In this form, more preferably, the predetermined angle θ may be 45 to 60 degrees. In this construction, more satisfactory contrast and brightness can be obtained in both reflective type display and transmissive type display.

In another form of the display device of the present invention, the variable transmission polarization axis means consists of a liquid crystal element. That is, the display device may be formed as a liquid crystal display device.

Further, in this case, the variable transmission polarization axis means may be a TN liquid crystal element, an STN liquid crystal element or an ECB (Electrically Controlled Birefringence) liquid crystal element. In this construction, a bright, high-quality reflective type display can be effected relatively easily. The STN liquid crystal element includes an STN liquid crystal element using an optical anisotropic matter for color compensation. Further, when a liquid crystal element having a birefringent effect such as an ECB liquid crystal element, it is possible to vary the coloring from the light source.

In another form of the display device of the present invention, a second variable transmission polarization axis means is further provided on the opposite side of the variable transmission polarization axis means with respect to the second polarized light separating means.

In this form, in reflective type display, the second variable transmission polarization axis means adjusts the absorption of the external light transmitted through the second polarized light separating means, and the contrast can be adjusted. On the other hand, in transmissive type display, the second variable transmission polarization axis means adjusts the intensity of the light source light transmitted through the second polarized light separating means, and the brightness can be adjusted.

In this form, the second variable transmission polarization optical axis means may consist of a liquid crystal element.

Further, in this case, the second variable transmission polarization axis means may be a TN liquid crystal element, an STN liquid crystal element or an ECB (Electrically Controlled Birefringence) liquid crystal element.

Further, in this form equipped with the second variable transmission polarization axis means, the second variable transmission polarization axis means may be arranged between the second polarized light separating means and the polarizer.

In this construction, for reflective type display, the direction of the linear polarized light transmitted through the second polarized light separating means is varied with respect to the transmission axis of the polarizer by the second variable transmission polarization axis means, whereby the proportion of the linear polarized light absorbed by the polarizer can be arbitrarily adjusted. Further, for transmissive type display, the direction of the linear polarized light transmitted through the polarizer is varied with respect to the second direction of the second polarized light separating means by the second variable transmission polarization axis means, whereby the proportion of the linear polarized light transmitted through the second polarized light separating means can be arbitrarily adjusted. As a result, the adjustment of contrast in reflective type display and the adjustment of brightness in transmissive type display can be conducted.

In another form of the display device of the present invention, a light transmitting light-diffusing means is further provided between the light source and the first polarized light separating means.

In this form, it is possible to effect a (paper-like) display that is not in a mirror finished surface state by the light transmitted through the first polarized light separating means and output as display light. The light-diffusing means may be arranged, for example, between the first polarized light separating means and the variable transmission polarization axis means or between the variable transmission polarization axis means and the first polarized light separating means.

The above object of the present invention can also be achieved by an electronic apparatus equipped with a display device according to the present invention as described above.

Since the electronic apparatus of the present invention is equipped with the above-described display device of the present invention, it is possible to realize various electronic apparatuses in which it is possible to effect bright display while maintaining the contrast at a desired level. Depending on its use, the electronic apparatus of the present invention may be equipped with one of the various forms of display device described above.

The object of the present invention can also be achieved by a display device comprising: a variable transmission polarization axis optical element; a first polarized light separator which is arranged on one side of the variable transmission polarization axis optical element and which effects polarized light separation by reflection or absorption; a second polarized light separator which is arranged on the other side of the variable transmission polarization axis optical element and which effects polarized light separation by reflection; a polarizer arranged on the opposite side of the variable transmission polarization axis optical element with respect to the second polarized light separator; and a light source which is arranged on the opposite side of the second polarized light separator with respect to the polarizer and which applies light to the variable transmission polarization axis optical element side, wherein the positional relationship between the second polarized light separator and the polarizer is determined such that the second direction is deviated by a predetermined angle θ (0°<θ<90°) with respect to the direction of the transmission axis of the polarizer and deviated by a predetermined angle θ' (0°<θ'<90°) with respect to the direction of the absorption axis of the polarizer.

As described above, in this display device, it is possible to obtain a high-contrast and bright display.

In the above-described display device of the present invention, it is possible to realize a bright reflective type display if it is formed as a display device of any well-known driving system such as the simple matrix system, the active matrix system using TFT (Thin Film Transistor), TFD (Thin Film Diode) or the like, or the segment system.

Further, apart from the above-described reflective polarizer, the polarized light separating means of the present invention may, for example, be a polarized light separating means consisting of a combination of a cholesteric liquid crystal layer and a (¼) λ plate, a polarized light separating means which effects separation into reflective polarization and transmissive polarization by utilizing Brewster's angle (See pp. 427–429 of S1D 92 D1 GEST), a polarized light separating means utilizing hologram, polarized light separating means disclosed in an internationally laid-open international application (Internal Publications No. WO95/27819 and WO95/17692) or the like. In each of the embodiments described below also, these polarized light separators can replace the reflective polarizer.

BRIEF DESCRIPTION OF THE DRAWINGS

FIGS. 5(a) and 5(b) are characteristic charts of the liquid crystal display device of the first embodiment of the present invention, of which FIG. 5(a) is a characteristic chart showing variation in contrast and reflectance when a predetermined angle e is varied in reflective type display, and FIG. 5(b) is a characteristic chart showing variation in contrast and transmittance when the predetermined angle e is varied in transmissive type display.

FIG. 7 is a table in which the contrast and transmittance characteristics of the second embodiment of the present invention and the comparative example are compared.

BEST MODE FOR CARRYING OUT THE INVENTION

The best mode for carrying out the present invention will now be described with reference to the drawings.

Operating Principle

First, the operating principle of a liquid crystal display device according to each embodiment of the present invention will be described with reference to FIGS. 1 through 3.

Figure 1:
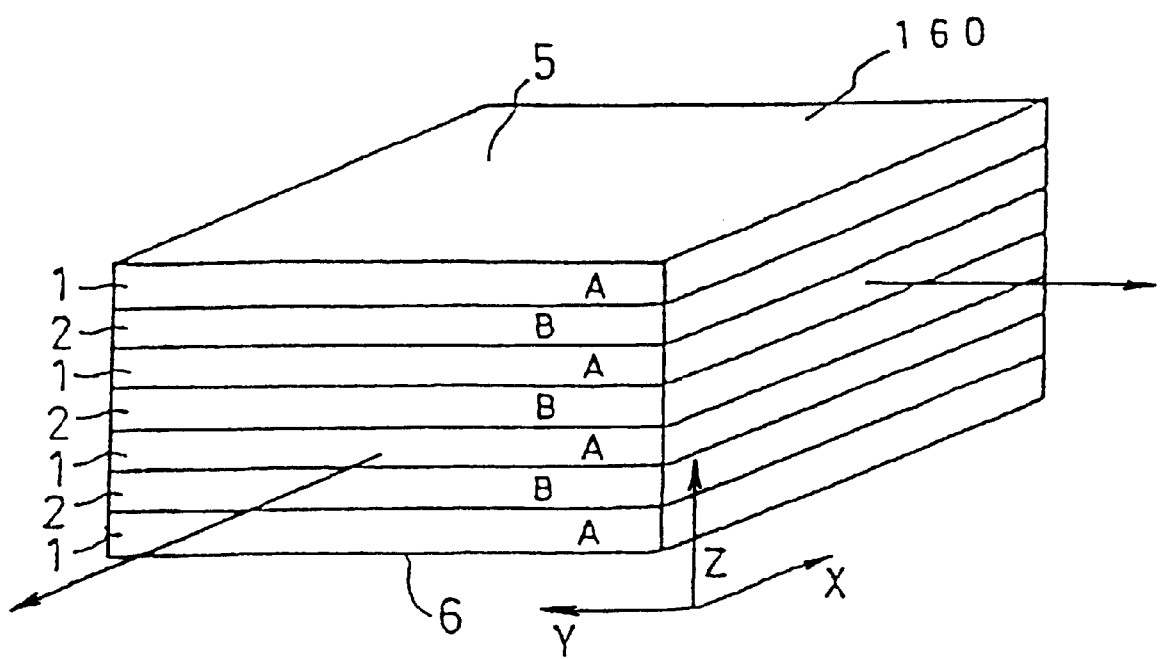
FIG. 1 is a schematic perspective view of a polarized light separator (reflective polarizer) used in a display device according to each embodiment of the present invention.

FIG. 1 is a schematic perspective view of a reflective polarizer, which is an example of the polarized light separator used in each embodiment of the present invention. The basic construction of this reflective polarizer is disclosed in Japanese Patent Laid-Open No. 9-50698 (International Publication No. WO/95/17692) and International Publication No. WO/95/27819.

A polarized light separator 160 is formed by a plurality of two different kinds of layers, 1 (A-layers) and 2 (B-layers) alternately stacking on each other. The refractive index (nAX) in the X-direction of the A-layers 1 is different from the refractive index (nAY) in the Y-direction thereof. The refractive index (nBX) in the X-direction of the B-layers 2 is equal to the refractive index (nBY) in the Y-direction thereof. The refractive index (nAY) in the Y-direction of the A-layers 1 is equal to the refractive index (nBY) in the Y-direction of the B-layers 2.

Thus, of the light impinging upon the polarized light separator 160 from the direction perpendicular to the upper surface 5 of this polarized light separator 160, the linear polarized light in the Y-direction is transmitted through this polarized light separator 160 and is output from the lower surface 6 as light of linear polarized light in the Y-direction. Conversely, of the light impinging upon the polarized light separator 160 from the direction perpendicular to the lower surface 6 of this polarized light separator 160, the light of linear polarized light in the Y-direction is transmitted through this polarized light separator 160 and is output from the upper surface 5 as light of linear polarized light in the Y-direction. Here, the direction in which transmission is effected (the Y-direction, in this example) will be referred to as the transmission axis.

Assuming that the thickness in the Z-direction of the A-layers 1 is tA, that the thickness in the Z-direction of the B-layers 2 is tB, and that the wavelength of the incident light is λ, the following relationship can be achieved:

$$tA \cdot nAX + tB \cdot nBX = \lambda/2 \tag{1}$$

By making this equation hold true, of the light which has the wavelength λ and which impinges upon the polarized light separator 160 from the direction perpendicular to the upper surface 5 of the polarized light separator 160, the light of linear polarized light in the X-direction is reflected by this polarized light separator 160 as light of linear polarized light in the X-direction. Further, of the light which has the wavelength λ and to the lower surface 6 of the polarized light separator 160, the light of linear polarized light in the X-direction is reflected by this polarized light separator 160 as light of linear polarized light in the X-direction. Here, the direction in which reflection is effected (the X-direction, in this example) will be referred to as the reflection axis.

By varying the thickness tA in the Z-direction of the A-layers 1 and the thickness tB in the Z-direction of the B-layers 2 such that the above equation (1) holds true over the entire wavelength range of visible light, it is possible to obtain a polarized light separator which reflects not only monochromatic light but also light of linear polarized light in the X-direction over the entire white light range as light of the linear polarized light in the X-direction and causes light of linear polarized light in the Y-direction to be transmitted as light of linear polarized light in the Y-direction.

By allowing the above equation (1) to hold true over a specific wavelength range of visible light, only light of this specific wavelength range is reflected, whereby it is possible to effect a display that is not in white but in a desired color.

Next, the operation of a transmissive display device using the operation of a reflective type display using external light and light source light in a display device using the reflective polarizer constructed as described above as the polarized light separator will be described with reference to FIGS. 2 and 3. FIG. 2 is a diagram illustrating the case in which external light impinges upon the display device, and FIG. 3 is a diagram illustrating the case in which the light source is lighted in the display device. The liquid crystal display device in these drawings is shown for the purpose of illustrating the principle of the present invention, and it goes without saying that the present invention is not restricted to the liquid crystal display device shown in these drawings.

Figure 2:
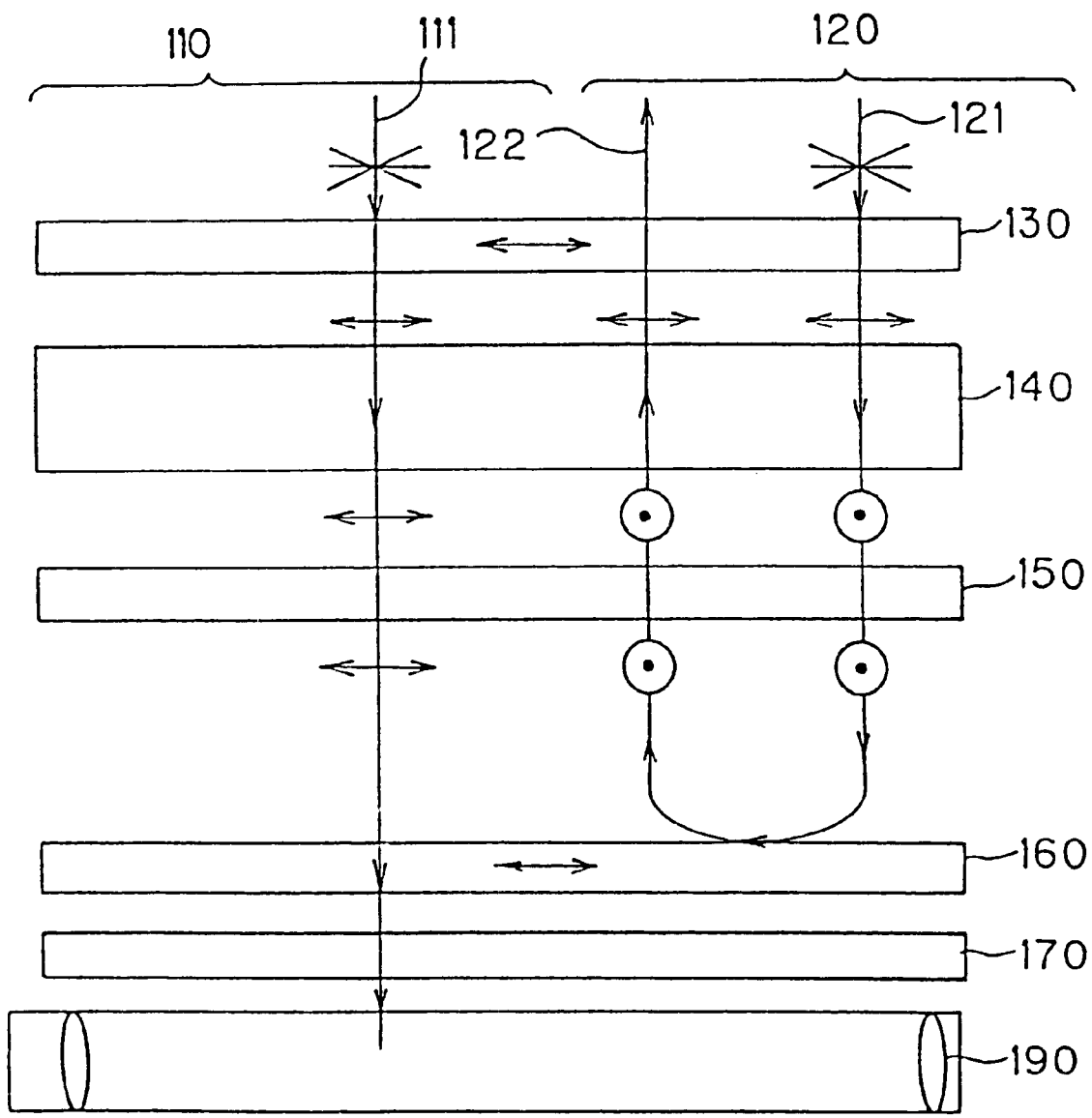
FIG. 2 is a diagram illustrating the operating principle of the display device of each embodiment of the present invention when effecting reflective type display.

As shown in FIG. 2, in the display device, a TN liquid crystal 140 is used as the variable transmission polarization axis optical element. Above the TN liquid crystal 140, a polarizer 130 is provided as an example of the first polarized light separating means. Below the TN element 140, a light scattering layer 150, a polarized light separator 160 as an example of the second polarized light separating means, and a polarizer 170 are provided in that order. Further, a light source 190 capable of emitting light from below the polarized light separator 160 is provided. In particular, in the present invention, the positional relationship between the plarized light separator 160 and the polarizer 170 is determined such that the direction of the transmission axis of the polarized light separator 160 (the second direction) is deviated by a predetermined angle θ (0°<θ<90°) with respect to the direction of the transmission axis of the polarizer 170 and deviated by a predetermined angle θ'(0°<θ'<90°) with respect to the direction of the absorption axis of the polarizer 170.

First, with reference to FIG. 2, the operating principle of reflective type display will be described, with the left-hand portion of this display device under external light being referred to as a voltage application portion 110 and the right-hand portion as a voltage non-application portion 120.

In the voltage non-application portion 120 on the right-hand side, natural light 121 incident as external light is turned into linear polarized light in a direction parallel to the plane of the drawing by the polarizer 130. After this, the direction of polarization is bent 90 degrees by the TN liquid crystal 140 to become linear polarized light perpendicular to the plane of the drawing, which is reflected by the polarized light separator 160 through the light scattering layer 150. The linear polarized light in perpendicular to the plane of the drawing, is again bent 90 degrees by the TN liquid crystal through the light scattering layer 150 to become linear polarized light in a direction parallel to the plane of the drawing, which is output from the polarizer 130 as linear polarized light in a direction parallel to the plane of the drawing. In this way, when no voltage is applied, the incident light is not absorbed but reflected by the polarized light separator 160, so that a bright display can be obtained. Since the light scattering layer 150 is provided between the polarized light separator 160 and the TN liquid crystal 140, the reflected light from the polarized light separator 160 is changed from the mirrorsurface state to the white state and seen in a wide visual field.

In the voltage application portion 110 on the left-hand side, the natural light 111 incident as external light is turned into linear polarized light in a direction parallel to the plane of the drawing by the polarizer 130. After this, it is transmitted through the TN liquid crystal 140 without changing the direction of polarization and transmitted through the polarized light separator 160 as linear polarized light in a direction parallel to the plane of the drawing. This transmitted light is absorbed by the polarizer 170 in accordance with the deviation between the transmission axis of the polarized light separator 160 and the transmission axis of the polarizer 170. Since the light transmitted through the polarizer 170 is absorbed or scattered at the light source 190 in a non-lighted state, so that little or practically no component is reflected by the light source 190 and transmitted through the polarizer 170 again as the component of the transmission axis of the polarizer 170.

In this way, in the voltage non-application portion 120, the light reflected by the polarized light separator 160 is scattered by the light scattering layer 150 to become white output light 122, and, in the voltage application portion 110, little or none of the light transmitted through the polarized light separator 160 is returned to the polarized light separator 160 due to the absorption by the polarizer 170 or the like, resulting in a dark display.

Next, with reference to FIG. 3, the operating principle of transmissive type display under light source light will be described, with the left-hand portion of the display device being referred to as the voltage application portion 110 and the right-hand portion thereof as the voltage non-application portion 120.

When the light source 190 is on, in the voltage non-application portion 120 on the right-hand side, the light source light 125 is turned by the polarizer 170 into linear polarized light in the direction of the transmission axis thereof and, further, turned into linear polarized light in a direction parallel to the plane of the drawing by the polarized light separator 160 before it is transmitted through the polarized light separator 160. Then, the direction of polarization of the linear polarized light transmitted through the polarized light separator 160, which is parallel to the plane of the drawing, is bent 90 degrees by the TN liquid crystal 140 and becomes linear polarized light in a direction perpendicular to the plane of the drawing before it is absorbed by the polarizer 130. That is, the voltage non-application portion 120 becomes dark.

In the voltage application portion 110, which is on the left-hand side, the light source light 115 is changed by the polarizer 170 to linear polarized light in the direction of the polarization axis thereof. Further, it is turned into linear polarized light in a direction parallel to the plane of the drawing by the polarized light separator 160 and transmitted through the polarized light separator 160. Thus, the light source light 125 is attenuated by the polarizer 170 and the polarized light separator 160 in accordance with the deviation between the transmission axis of the polarizer 170 and the transmission axis of the polarized light separator 160. Then, the linear polarized light parallel to the plane of the drawing transmitted through the polarized light separator 160 is transmitted as linear polarized light 116 parallel to the plane of the drawing without changing the direction of polarization by the TN liquid crystal 140 and output without being absorbed by the polarizer 130. That is, the voltage application portion 110 becomes bright in the color of the light source light 116.

In this way, in the voltage non-application portion 120, absorption by the polarizer 130 occurs and it becomes dark, and, in the voltage application portion 110, absorption by the polarizer 130 does not occur and it becomes bright. Thus, when the light source 190 is on, a display in the light source color on the black background is obtained.

While in the above-described example TN liquid crystal 140 is used as an example, the basic operating principle does not change if other liquid crystals, such as STN liquid crystal or ECB (Electrically Controlled Birefringence) liquid crystal, whose transmissive polarization axis can be changed by voltage or the like, is used instead of the TN liquid crystal 140.

Various embodiments according to display devices which operate on the above-described principle will now be described.

First Embodiment

Figure 4:
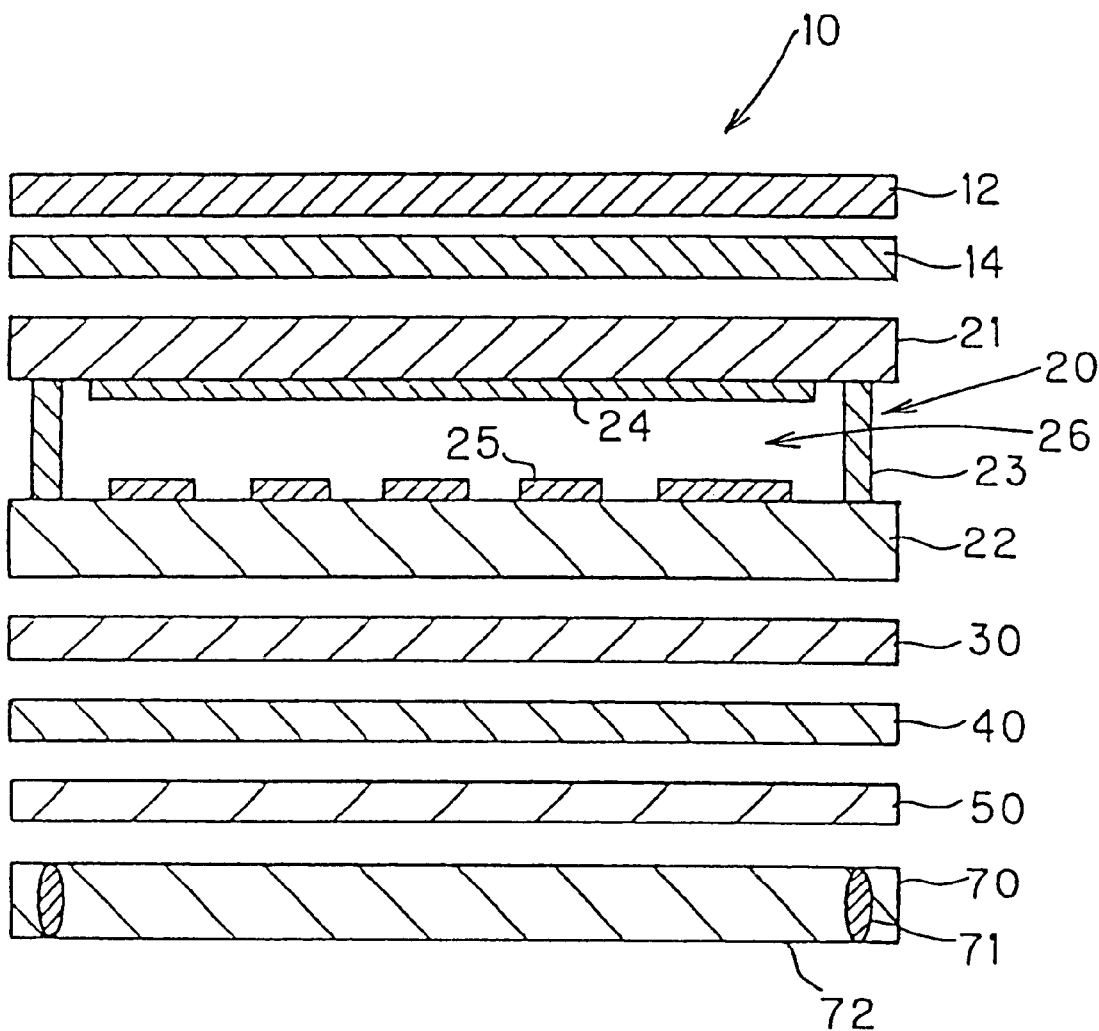
FIG. 4 is an exploded sectional view illustrating a liquid crystal display device according to a first embodiment of the present invention.

A liquid crystal display device according a first embodiment of the present invention will be described with reference to FIGS. 4 and 5. FIG. 4 is an exploded sectional view illustrating a liquid crystal display device according to the first embodiment of the present invention, and FIG. 5 is a characteristic chart showing the contrast characteristics, transmittance characteristics or the like thereof.

As shown in FIG. 4, in the liquid crystal display device 10 of the first embodiment, an STN cell 20 is used as the variable transmission polarization axis optical element. Above the STN cell 20, a phase difference film 14 and a polarizer 12 are provided in that order. Below the STN cell 20, a light diffusing plate 30, a polarized light separator 40 and a polarizer 50 are provided in that order. Further, there is provided a light source 70 by means of which light can be applied from below the polarizer 50. The light source 70 consists of an LED (Light Emitting Diode) 71, which emits light upwards by means of a light guide 72.

The polarized light separator 40 consists of the polarized light separator (that is, the reflective polarizer) described with reference to FIG. 1.

In the STN cell 20, STN liquid crystal 26 is sealed in a cell formed by two glass substrates 21 and 22 and a seal member 23. A transparent electrode 24 is provided on the lower side of the glass substrate 21, and a transparent electrode 25 is provided on the upper side of the glass substrate 22. The transparent electrodes 24 and 25 may consist of ITO (Indium Tin Oxide), tin oxide or the like.

The phase difference film 14 consists of an optical anisotropic member for color compensation, and is used for the purpose of correcting coloring generated in the STN cell 20.

Figure 3:
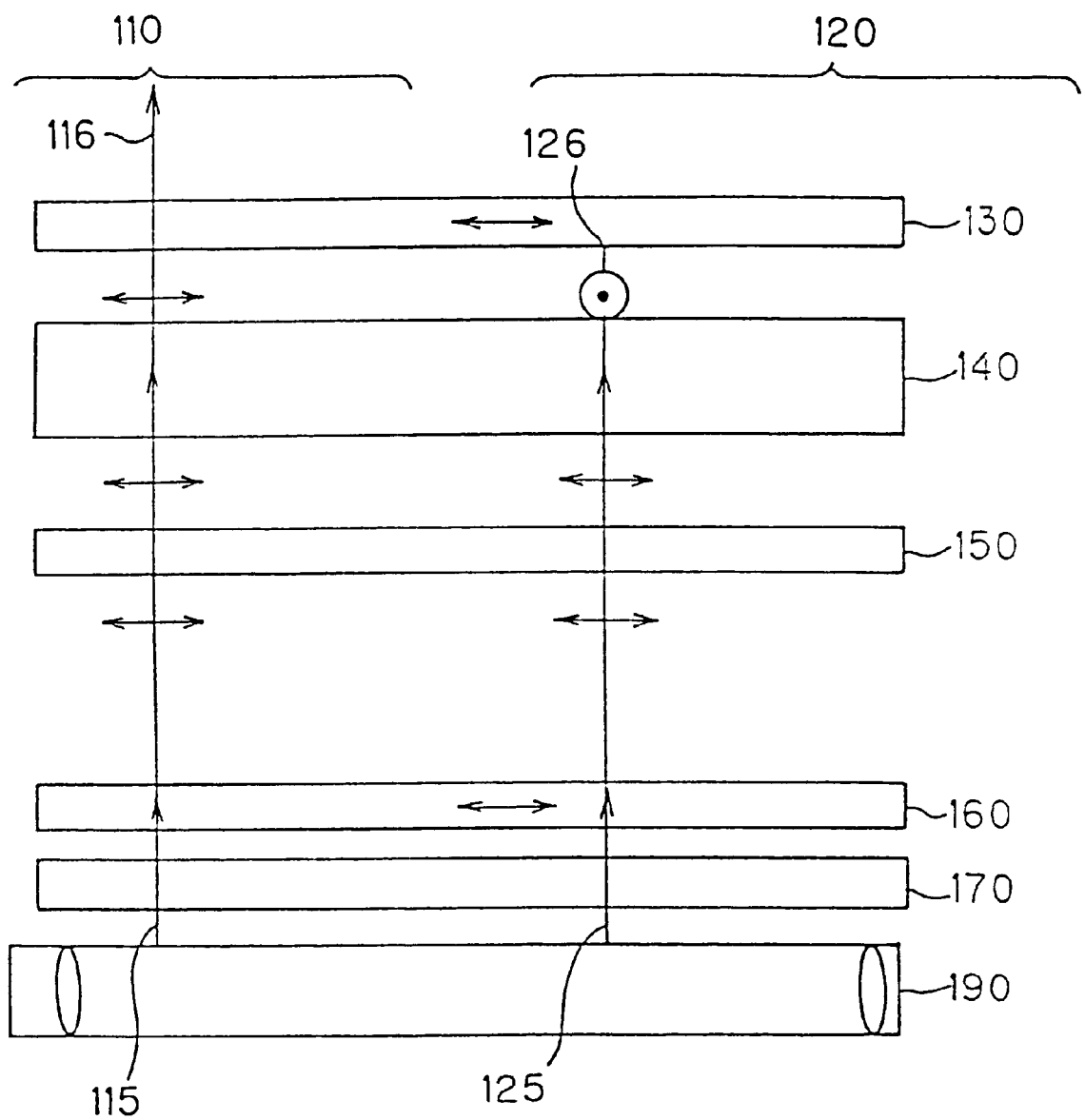
FIG. 3 is a diagram illustrating the operating principle of the display device of each embodiment of the present invention when effecting transmissive type display.

The operating principle of the liquid crystal display device 10 of this embodiment is the same as that in the case of FIGS. 2 and 3. Thus, under external light, light reflected by the polarized light separator 40 in the voltage non-application area is diffused by the light diffusing plate 30 and output as white linear polarized light; little of the light transmitted through the polarized light separator 40 in the voltage application area returns to the polarized light separator 40 due to the absorption by the polarizer 50 or the like, and it becomes dark. Thus, a black display on a white ground is obtained. Further, when the light source 70 is on, absorption by the polarizer 12 occurs in the voltage non-application area, and it becomes dark; in the voltage application area, absorption by the polarizer 12 does not occur, and it becomes bright. Thus, when the light source 70 is on, a display in the light source color on a black ground is obtained. That is, under external light, a black positive display on a white background is obtained, and, when the light source 70 is on, a negative display in the light source color on a black ground is obtained.

Here, in the case of reflective type display, the positional relationship between the polarized light separator 40 and the polarizer 50 is determined such that the direction of the transmission axis of the polarized light separator 40 is deviated by a predetermined angle θ (0°<θ<90°) with respect to the direction of the transmission axis of the polarizer 50, so that, compared with the case in which the direction of the transmission axis of the polarized light separator 40 coincides with the direction of the transmission axis of the polarizer 50 (that is, θ=0°), the light transmitted through the polarized light separator 40 is absorbed by the polarizer 50 in a much larger quantity. Thus, it is possible to make the voltage application portion dark by this absorbed portion, so that the contrast is enhanced. Regarding the brightness in the reflective type display, the brightness is enhanced since polarized light separation is effected not by absorption of light but by reflection of light at the polarized light separator 40 and this reflected linear polarized light component is utilized as the display light.

In the case of transmissive type display, the positional relationship between the polarized light separator 40 and the polarizer 50 is determined such that the direction of the transmission axis of the polarized light separator 40 is deviated by a predetermined angle θ' (0°<θ'<90°) with respect to the direction of the absorption axis of the polarizer 50, so that, compared with the case in which the direction of the transmission axis of the polarized light separator 40 coincides with the direction of the absorption axis of the polarizer 50 (that is, θ'=0°), the light source light is transmitted through the polarizer 50 and the polarized light separator 40 in a much larger quantity. Thus, it is possible to make the voltage application portion bright by this transmitted portion, so that the contrast is enhanced and the brightness is enhanced.

Here, the predetermined angle θ made by the transmission axis of the polarizer 50 and the transmission axis of the polarized light separator 40, will be considered more specifically with reference to FIG. 5. In the case of this embodiment, the angle θ' made by the transmission axis and the absorption axis in the polarizer 50 is a right angle. That is, the predetermined angle θ'=90 degrees—the predetermined angle θ.

Further, in this case, the twist angle of the STN liquid crystal 26 is 250 degrees, the thickness of the liquid crystal layer is 5.8 μm, the optical anisotropy Δn is 0.138, the retardation value of the phase difference film 14 is 570 nm, and the duty ratio is 1/240.

Figure 5A:
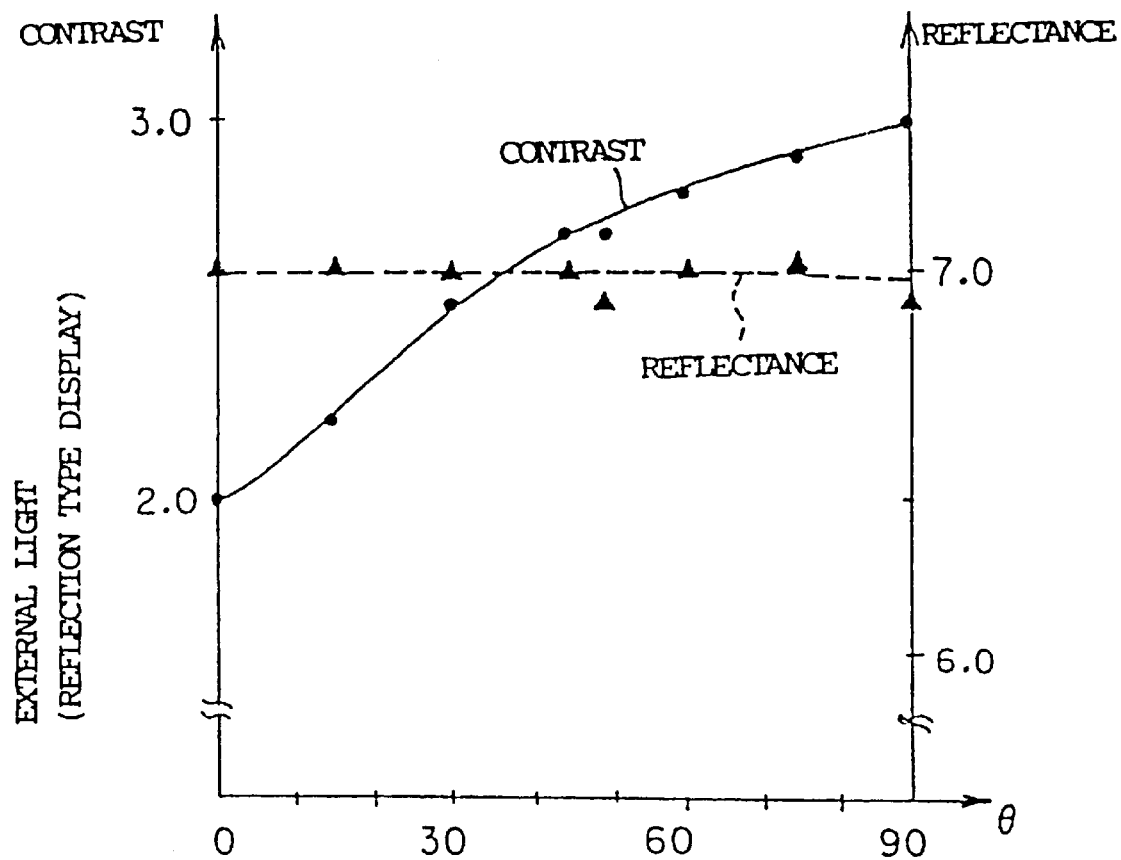
Figure 5B:
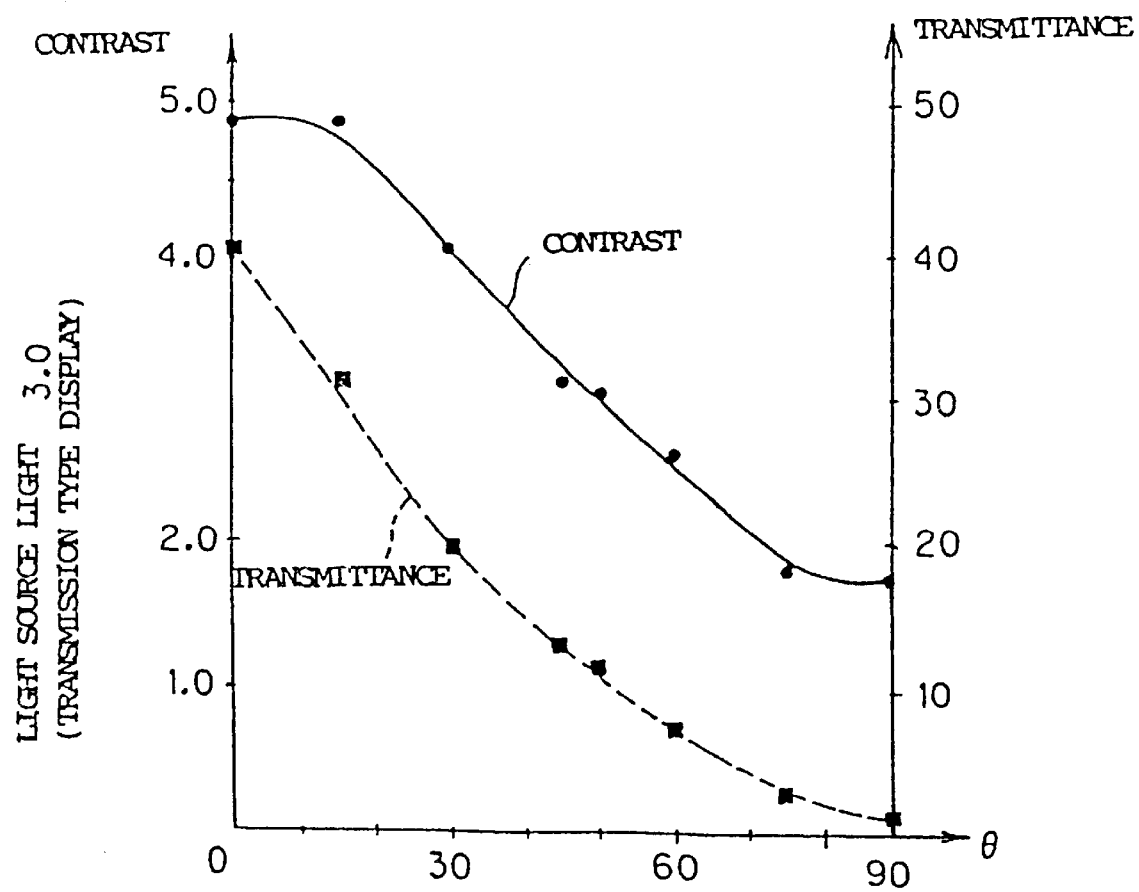

FIG. 5(a) is a characteristic chart showing the variation in contrast and reflectance when the angle θ is varied under external light (in reflective type display) in the display device 10, and FIG. 5(b) is a characteristic chart showing the variation in contrast and transmittance when the angle θ is varied under light source light (in transmissive type display).

As shown in FIG. 5, in the display device 10, when this angle θ is varied by varying the positional relationship between the polarized light separator 40 and the polarizer 50, the contrast and brightness vary. In particular, when the angle θ increases, the contrast in reflective type display is enhanced and the transmittance in transmissive type display is reduced, resulting in the brightness being reduced. Further, if the angle θ increases, scarcely any change in the reflectance in reflective type display is to be observed, and the brightness is substantially constant, the contrast in transmissive type display being reduced.

On the other hand, when the angle θ decreases, the contrast in reflective type display is reduced and the transmittance in transmissive type display is augmented, resulting in the brightness being increased. Further, if the angle θ decreases, scarcely any change in the reflectance in reflective type display is to be observed, and the brightness is substantially constant, the contrast in transmissive type display being enhanced.

According to the study of the present inventor, generally speaking, it is desirable that the contrast is satisfactory in reflective type display. More specifically, in the characteristic chart of FIG. 5(a), the angle θ is preferably 30 to 75 degrees. Further, in the characteristic chart 5(a), the contrast in reflective type display is more satisfactory when the angle θ is 45 to 60 degrees. At the same time, in the characteristic chart 5(b), the transmittance in transmissive type display (that is, the brightness) is at a satisfactory level from the viewpoint of practical use.

As described above, thanks to the display device 10 of this embodiment, in particular, in reflective type display, it is possible to achieve a high level of contrast and reflectance (that is, brightness of display) in the display device 10 based on the polarized light separator 40, the polarizer 50 or the like, and, in transmissive type display, it is possible to achieve a high level of contrast and transmittance (that is, brightness of display) in the display device 10 based on the polarized light separator 40, the polarizer 50 or the like.

Second Embodiment

Figure 6:
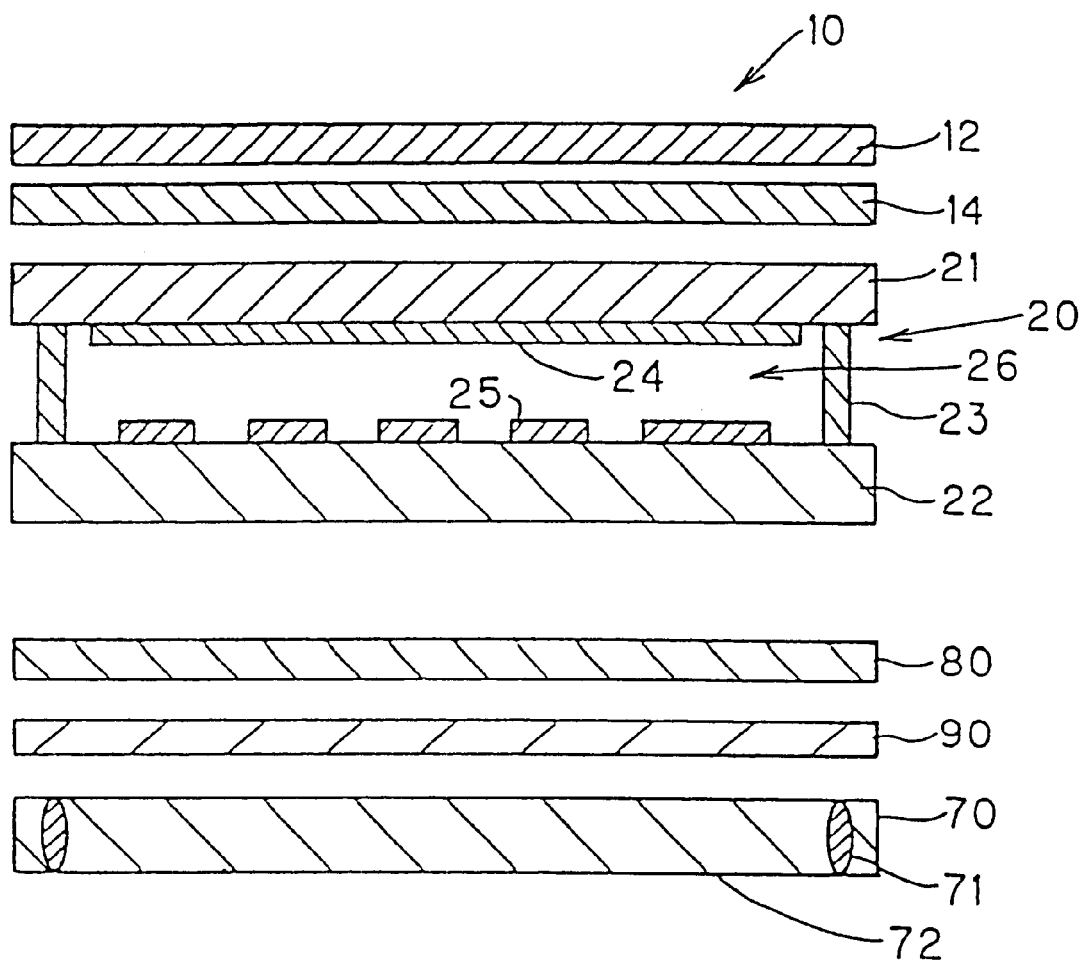
FIG. 6 is an exploded sectional view illustrating a liquid crystal display device according to a comparative example with respect to a second embodiment of the present invention.

Next, a liquid crystal display device according to the second embodiment of the present invention will be described with reference to FIGS. 6 and 7. FIG. 6 is an exploded sectional view illustrating a display device according to a comparative example with reference to the second embodiment of the present invention, and FIG. 7 is a table in which the contrast characteristics or the like of the second embodiment and the comparative example are compared.

In the second embodiment, in the above-described first embodiment, in particular, the angle θ is 50 degrees, the twist angle of the STN liquid crystal 26 is 240 degrees, the thickness of the liquid crystal layer is 6.5 μm, the optical anisotropy Δn of the liquid crystal is 0.133, and the retardation value of the phase difference film 14 is 600 nm. Apart from the above, it has the same construction as that of the first embodiment shown in FIG. 4.

The characteristics at the time of reflection and when the light source is on in the second embodiment constructed as described above were examined. As a comparative example, a display device as shown in FIG. 6 was used. In the comparative example, a polarizer 80 and a transflector 90 are provided instead of the light diffusing plate 30, the polarized light separator 40 and the polarizer 50.

The table of FIG. 7 shows the characteristics at the time of reflection and when the light source is on when 1/240 duty drive is conducted.

As is apparent from the table of FIG. 7, although the contrast at the time of reflection remains the same, the reflectance increases 65%. When the light source is on, the transmittance does not change very much, but the contrast is enhanced by 15%. This is due to the fact that while in the comparative example the inter-dot area is bright, it is dark in the embodiment so that the contrast is enhanced.

Third Embodiment

Figure 8:
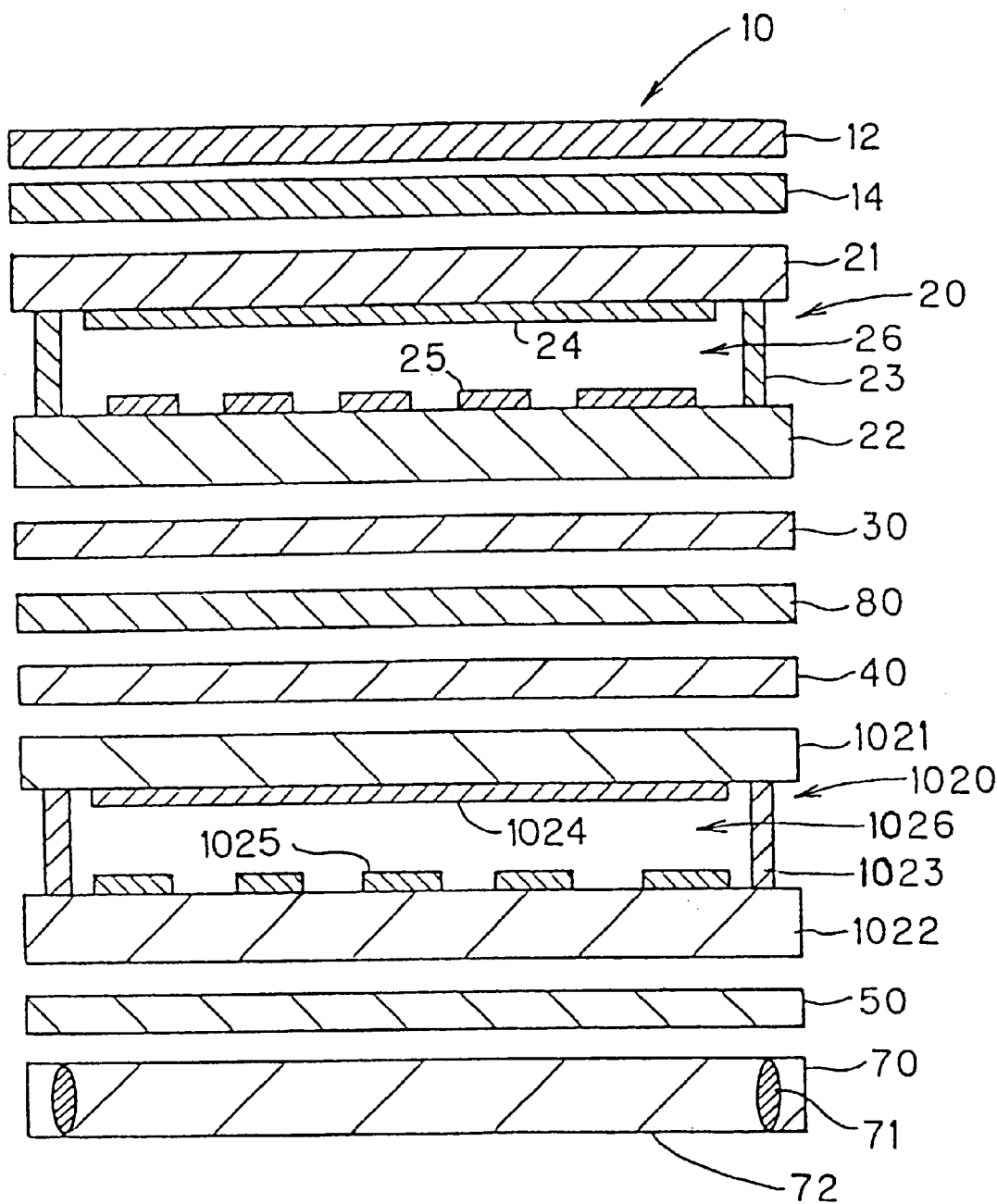
FIG. 8 is an exploded sectional view illustrating a liquid crystal display device according to a third embodiment of the present invention.

A liquid crystal display device according to a third embodiment of the present invention will be described with reference to FIG. 8. FIG. 8 is an exploded sectional view illustrating a liquid crystal display device according to the third embodiment of the present invention.

In the third embodiment, there is provided, in contrast the above-described first embodiment, a TN liquid crystal cell 1020 between the polarized light separator 40 and the polarizer 50. Apart from the above, it has the same construction as that of the first embodiment shown in FIG. 4.

As shown in FIG. 8, in the TN cell 1020, TN liquid crystal 1026 is sealed in a cell formed by two glass substrates 1021 and 1022 and a seal member 1023. On the lower side of the glass substrate 1021, a transparent electrode 1024 is provided, and, on the upper side of the glass substrate 1022, a transparent electrode 1025 is provided. Voltage can be applied between the transparent electrode 1024 and the transparent electrode 1025.

By controlling the voltage applied between the transparent electrode 1024 and the transparent electrode 1025, it is possible to set the contrast at the time of reflection and the brightness at the time of transmission.

Fourth Embodiment

In the fourth embodiment, there is provided, in the above described third embodiment, an ECB liquid crystal cell is provided instead of the TN liquid crystal cell 1020. By controlling the voltage applied between the transparent electrode 1024 and the transparent electrode 1025, it was possible to vary the outward color.

Further, by adopting a dot matrix construction for the transparent electrode 1024 and the transparent electrode 1025, it is possible to effect a display with a further increased amount of information.

In the first through fourth embodiments described above, it is possible for the polarizer 12 (the polarized light separator 130 in FIGS. 2 and 3) to consist of a reflective polarizer as shown in FIG. 1 like the polarized light separator 40.

Further, it is also possible not only to effect white display by using a reflective polarizer which reflects light over the entire wavelength range of visible light as the polarized light separator but to effect display in a desired color by using a reflective polarizer which reflects light in a specific wavelength range as the polarized light separator.

Fifth Embodiment

The fifth embodiment consists of an electronic apparatus in which a liquid crystal display device according to each of the above-described embodiments is mounted.

Figure 9A:
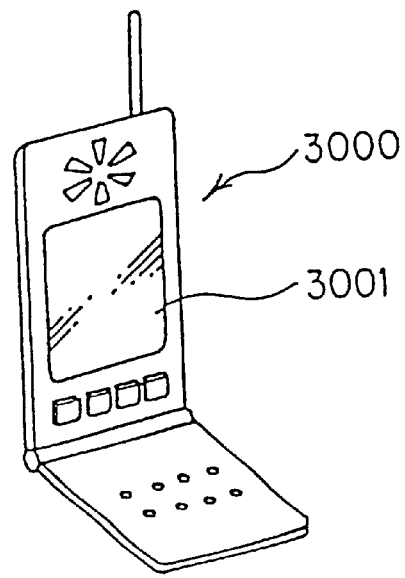
FIGS. 9(a), 9(b) and 9(c) are perspective views of embodiments of electronic apparatuses of the present invention.
Figure 9B:
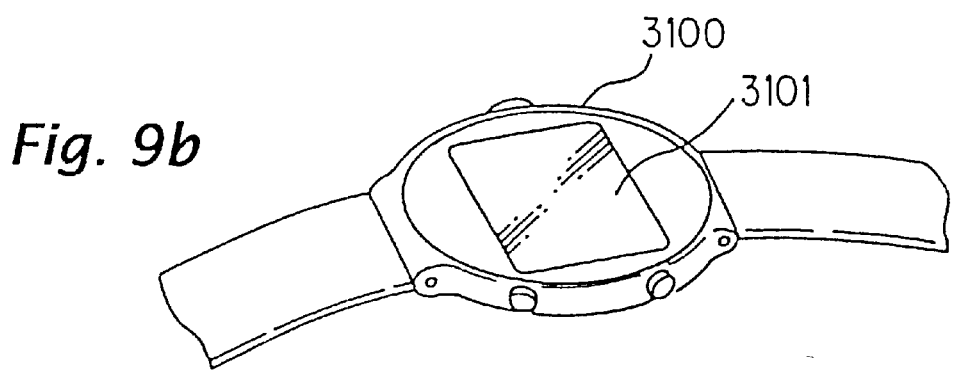
Figure 9C:
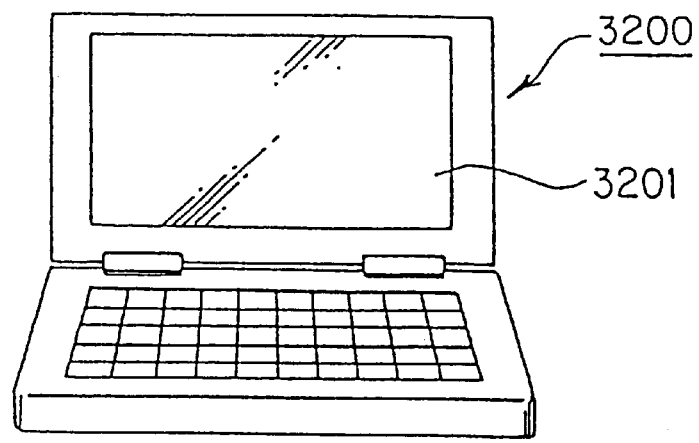

That is, when the liquid crystal display device of each of the above embodiments is applied, for example, to a display portion 3001 of a portable telephone 3000 as shown in FIG. 9(*a*), it is possible to realize an energy-saving portable telephone which effects a bright, high-contrast reflective type display in the sun, in the shade and indoors.

Further, when it is applied to a display portion 3101 of a wristwatch 3100 as shown in FIG. 9(*b*), it is possible to realize an energy-saving wristwatch which effects a bright, high-contrast reflective type display in the sun, in the shade and indoors.

Further, when it is applied to a display screen 3201 of a personal computer (or information terminal) 3200 as shown in FIG. 9(*c*), it is possible to realize an energy-saving personal computer which effects a bright, high-contrast reflective type display in the sun, in the shade and indoors.

Apart from the electronic apparatuses shown in FIG. 9, the liquid crystal display device of this embodiment can be applied to electronic apparatuses, such as a liquid crystal television set, a view-finder-type or a monitor direct-view-type video tape recorder, a car navigation device, an electronic notebook, an electronic calculator, a word processor, an engineering work station (EWS), a picturephone, a POS terminal, and an devices equipped with a touch panel.

Industrial Applicability

The display device of the present invention uses a liquid crystal device as a variable transmission polarization axis means, and can be used as a high-contrast and bright display device which serves as both a reflective type and a transmissive type display device. Further, it can be used as a display device using a variable transmission polarization axis means other than a liquid crystal device. Further, the electronic apparatus of the present invention is formed by using this display device and can be used as a high-contrast and bright energy-saving electronic apparatus or the like that can perform both reflective type display and transmissive type display.

What is claimed is:

1. A display device comprising:
   variable transmission polarization axis means capable of varying a transmission polarization axis;
   first polarized light separating means which is arranged on one side of the variable transmission polarization axis means and which allows light that is a linear polarized light component in a first direction to be transmitted and reflects or absorbs light that is a linear polarized light component in a predetermined direction different from the first direction;
   second polarized light separating means which is arranged on another side of the variable transmission polarization axis means and which allows light that is a linear polarized light component in a second direction to be transmitted and reflects light that is a linear polarized light component in a predetermined direction different from the second direction;

a polarizer arranged on an opposite side of the variable transmission polarization axis means with respect to the second polarized light separating means; and a light source which is arranged on an opposite side of the second polarized light separating means with respect to the polarizer and which applies light to the variable transmission polarization axis means side, wherein a positional relationship between the second polarized light separating means and the polarizer is determined such that the second direction is deviated by a predetermined angle θ (30°<θ<75°) with respect to a direction of a transmission axis of the polarizer and deviated by a predetermined angle θ' (0°<θ'<90°) with respect to a direction of an absorption axis of the polarizer.

2. The display device according to claim 1, wherein the first polarized light separating means comprises a reflective polarizer which causes light that is a linear polarized light component in the first direction to be transmitted and which reflects light that is a linear polarized light component in a direction orthogonal to the first direction.

3. The display device according to claim 2, wherein the reflective polarizer comprises a laminate formed by alternately stacking together birefringent first layers and second layers which have a refractive index that is substantially equal to one of a plurality of refractive indexes of the first layers and which are not birefringent.

4. The display device according to claim 1, wherein the first polarized light separating means comprises a polarizer which allows light of the linear polarized light component in the first direction to be transmitted and absorbs the light of the linear polarized light component in a direction orthogonal to the first direction.

5. The display device according to claim 1, wherein the second polarized light separating means comprises a reflective polarizer which causes light of the linear polarized light component in the second direction to be transmitted and reflects light of the linear polarized light component in a direction orthogonal to the second direction.

6. The display device according to claim 5, wherein the reflective polarizer comprises a laminate formed by alternately stacking together birefringent first layers and second layers which have a refractive index that is substantially equal to one of a plurality of refractive indexes of the first layers and which are not birefringent.

7. The display device according to claim 1, wherein the second polarized light separating means causes the linear polarized light component in the second direction to be transmitted and reflects light of the linear polarized light component in a direction orthogonal to the second direction with respect to light of substantially an entire wavelength range of visible light.

8. The display device according to claim 1, wherein the transmission axis and the absorption axis of the polarizer are at right angles.

9. The display device according to claim 1, wherein the predetermined angle θ is 45 to 60 degrees.

10. The display device according to claim 1, wherein the variable transmission polarization axis means comprise a liquid crystal element.

11. The display device according to claim 10, wherein the variable transmission polarization axis means consists of a TN liquid crystal element, an STN liquid crystal element or an ECB liquid crystal element.

12. The display device according to claim 1, wherein a second variable transmission polarization axis means is further provided on the opposite side of the variable transmission polarization axis means with respect to the second polarized light separating means.

13. The display device according to claim 12, wherein the second variable transmission polarization axis means comprises a liquid crystal element.

14. The display device according to claim 13, wherein the second variable transmission polarization axis means comprises a TN liquid crystal element, an STN liquid crystal element or an ECB liquid crystal element.

15. The display device according to claim 12, wherein the second variable transmission polarization axis means is arranged between the second polarized light separating means and the polarizer.

16. The display device according to claim 1, wherein light-transmissive light diffusion means is further provided between the light source and the first polarized light separating means.

17. An electronic apparatus equipped with a display device as claimed in claim 1.

18. A display device comprising:

a variable transmission polarization axis optical element;

a first polarized light separator which is arranged on one side of the variable transmission polarization axis optical element and which effects polarization separation by reflection or absorption;

a second polarized light separator which is arranged on another side of the variable transmission polarization axis optical element and which effects polarization separation by reflection;

a polarizer arranged on an opposite side of the variable transmission polarization axis optical element with respect to the second polarized light separator; and a light source which is arranged on an opposite side of the second polarized light separator with respect to the polarizer and which applies light to the variable transmission polarization axis optical element side, wherein a positional relationship between the second polarized light separator and the polarizer is determined such that the second direction is deviated by a predetermined angle θ (30°<θ<75°) with respect to a direction of a transmission axis of the polarizer and deviated by a predetermined angle θ' (0°<θ'<90°) with respect to a direction of an absorption axis of the polarizer.

19. A liquid crystal display device comprising:

a liquid crystal layer having a variable transmission polarization axis;

a first polarizer disposed on a first side of said liquid crystal layer;

a light scattering layer disposed on a second side of said liquid crystal layer;

a polarized light separator disposed on a side of said light scattering layer opposite said liquid crystal layer;

a second polarizer disposed on a side of said polarized light separator opposite said light scattering layer; and a light source disposed on a side of said second polarizer opposite said polarized light separator;

wherein a transmission axis of said polarized light separator forms a predetermined angle θ between 30 and 75 degrees relative to a transmission axis of said second polarizer and a predetermined angle θ' relative to an absorption axis of said second polarizer.

20. The device of claim 19 further comprising a phase difference film disposed between said liquid crystal layer and said first polarizer.

21. The device of claim 19 wherein said predetermined angle θ is between 0° and 90°, and said predetermined angle θ' is between 0° and 90°.

22. The device of claim 21 wherein said predetermined angle θ is between 45° and 60°.

23. A display device comprising:

variable transmission polarization axis means capable of varying a transmission polarization axis;

first polarized light separating means which is arranged on one side of the variable transmission polarization axis means and which allows light that is a linear polarized light component in a first direction to be transmitted and reflects or absorbs light that is a linear polarized light component in a predetermined direction different from the first direction;

second polarized light separating means which is arranged on another side of the variable transmission polarization axis means and which allows light that is a linear polarized light component in a second direction to be transmitted and reflects light that is a linear polarized light component in a predetermined direction different from the second direction;

a polarizer arranged on an opposite side of the variable transmission polarization axis means with respect to the second polarized light separating means; and a light source which is arranged on an opposite side of the second polarized light separating means with respect to the polarizer and which applies light to the variable transmission polarization axis means side, wherein a positional relationship between the second polarized light separating means and the polarizer is determined such that the second direction is deviated by a predetermined angle θ (0°<θ<90°) with respect to a direction of a transmission axis of the polarizer and deviated by a predetermined angle θ' (0°<θ'<90°) with respect to a direction of an absorption axis of tie polarizer;

wherein the first polarized light separating means comprises a reflective polarizer which causes light that is a linear polarized light component in the first direction to be transmitted and which reflects light that is a linear polarized light component in a direction orthogonal to the first direction.

* * * * *

UNITED STATES PATENT AND TRADEMARK OFFICE
CERTIFICATE OF CORRECTION

PATENT NO. : 6,507,380 B1
DATED : January 14, 2003
INVENTOR(S) : Iijima

It is certified that error appears in the above-identified patent and that said Letters Patent is hereby corrected as shown below:

Title page,
Item [56], References Cited, U.S. PATENT DOCUMENTS, add
-- U.S. 6,008,871  12/1999  Okumura --;

Column 1,
Line 6, after "device" insert -- and --;
Line 7, delete "and";

Column 6,
Line 42, delete "range";
Line 49, after "wavelength" insert -- range --;
Line 49, delete "range";

Column 9,
Lines 15 and 17, "e" should be -- $\theta$ --.

Column 12,
Line 50, after "according" insert -- to --;

Column 13,
Line 33, "ground" should be -- background --;

Column 16,
Line 36, "an" should be -- any --;

Column 20,
Line 20, "tie" should be -- the --.

Signed and Sealed this

Fourth Day of November, 2003

JAMES E. ROGAN
*Director of the United States Patent and Trademark Office*